Patented Aug. 19, 1924.

1,505,181

UNITED STATES PATENT OFFICE.

HEINRICH WIELAND, OF MUNICH, GERMANY. REISSUED

PROCESS FOR OBTAINING THE ACTIVE PRINCIPLE OF LOBELIA.

No Drawing. Application filed July 9, 1920, Serial No. 395,131. Renewed November 21, 1922.

(GRANTED UNDER THE PROVISIONS OF THE ACT OF MARCH 3, 1921, 41 STAT. L., 1313.)

*To all whom it may concern:*

Be it known that I, HEINRICH WIELAND, a citizen of the Free State of Bavaria, in the German Republic, residing at Munich, in the Free State of Bavaria, Germany, have invented Improvements in and Relating to a Process for Obtaining the Active Principle of Lobelia (for which I have filed applications in Germany April 4, 1914, and May 17, 1915); and I do hereby declare the following to be a full, clear, and exact description of the same.

Up to date very little is known about the alkaloids of *Lobelia inflata* and the investigators of same agree that said alkaloids as well as their salts are very little stable. The attempts to obtain the active therapeutic principle of the drug in pure form were apparently not well directed for until now the opinion prevails that the initial material is unusually sensitive and that efforts to solve this question could therefore not be expected to meet with much success.

Yet it is possible to obtain the desired compound in pure and stable form in a relatively simple manner. The effective alkaloid freed from its companion products proves a well characterized compound which crystallizes well and is only a little sensitive. The salts also are of good crystallizing properties and are chiefly neither hygroscopic nor decomposable.

C. Siebert, see "Beitrag zur Kenntnis des Lobelins und Lupanins" (Inaugural-Dissertation, Marburg 1891) described on page 10 a pretended uniform lobeline as a melligenous liquid which is said to give a chlorhydrate crystallizing from water. The bases described by Siebert are however deficient in all signs of uniformity. The chlorhydrate mentioned above also is not as Siebert seemed to assume the salt of the effective base as it corresponds to the formula $C_{18}H_{23}NO_2HCl+H_2O$ while the base separated according to the new process gives analysis figures which agree to the formula $C_{21}H_{23}NO_2$. Siebert probably had in hand the chlorhydrate of the ε-lobeline which in water and especially in hydrochloric acid is rather difficult to dissolve.

According to the experiments carried out by the inventor at least three alkaloids are present in the raw lobeline:

(1) α-lobeline, colourless crystals of 120° melting point. Has the known effect of the *Lobelia inflata*. Formula $C_{21}H_{25}NO_2$.

(2) ε-lobeline, not crystalline. Is characterized by a chlorhydrate which is rather difficult to dissolve in water.

(3) γ-lobeline, not crystalline. The salts also are not crystalline.

The α-lobeline furthermore furnishes an amorphous yellow white platinic chloride double-salt which contains 17.6% of platinum.

α-lobeline and ε-lobeline give difficultly soluble mercurous double-salts which if desired may serve to clean the base mixture.

According to the new process my mixture of the raw lobeline alkaloids obtained by the usual methods of recovering alkaloids is dissolved in hydrochloric acid and after removing the crystals of chlorhydrate of the ε-lobeline the chlorhydrate of the effective α-lobeline is separated by shaking out with chloroform or a like solvent.

The drug may be drained by alcohol; after distilling off of the alcohol the basic portions may be extracted from the residue by diluted acids and the alkaloids recovered from the acid solutions by alkali and ether, or other solvent as for instance benzene. From these extracts the bases are obtained in ethereal solution by shaking with acids and again treating with alkali.

In each case an ether solution is obtained which leaves behind the alkaloids as a melligenous liquid which furnishes the initial substance for the process. The bases are dissolved in diluted hydrochloric acid and after some standing the ε-lobeline chlorhydrate crystallizes. As soon as it is obvious that the deposit does not increase it is filtered off. The filtrate, upon being repeatedly shaken with chloroform delivers to same the α-lobeline as chlorhydrate and in consequence of the partial hydrolysis also a small part of the base. The chloroform is then shaken with a soda solution and thereupon the chloroform is carefully evaporated. The residue crystallizes after short standing; the crystals are then washed with ether and if necessary the base is re-crystallized from ether.

Beautiful colourless crystals having a melting point of 120° C. are obtained, the crystals being easily soluble in most of the organic solvents.

The analysis gives the following values: C 78.7%, H 7.7%, N 4.5%.

For $C_{21}H_{23}NO_2$ is calculated C 78.5%, H 7.2%, N 4.4%.

α-lobeline is very difficultly soluble in water.

The chlorhydrate dissolves readily in water whereas the bromohydrate is more difficultly soluble. Both salts are of a neutral reaction. The chloroplatinate, which is nearly insoluble in water is deposited as fine crystalline powder. The mercurous double-salt is just as difficulty soluble.

The α-lobeline is to be used internally as well as in form of injections to be used for asthma and the like diseases.

Example: For the exhaustive extraction of the drug the application of 15 times the quantity of extraction agent (as for instance alcohol ether) is as a rule sufficient. The drug is made alkaline preferably by adding of from one half to equal weight of a soda solution of 3–10%. The time required for the extraction depends, as in all such cases, on the flowing velocity of the extraction agent. 7 kg. of drugs may be exhausted in 7–10 hours. Heating is not necessary. The average content of the drug is about ½% of raw alkaloids which in wide ranges contain between 30 and 50% of α-lobeline and 20–40% of ɞ-lobeline. The raw alkaloid is dissolved in 25 times its quantity of a weak hydrochloric acid and 6–8 times shaken with one tenth of volume of chloroform after the crystals of chlorhydrate of the ɞ-lobeline have been separated.

It has further been shown that the effective α-lobeline may be obtained from the mixture with ɞ-lobeline dissolved in hydrochloric acid not only by shaking out with chloroform but also with other solvents such as for example carbon tetrachloride, trichlorethylene or acetylene tetrachloride.

If the chloroform be substituted by the solvents referred to one obtains the advantage of lowering the cost by avoiding the losses of solvents.

Example: The raw alkaloids of the lobelia obtained from the drug in the manner described above are dissolved in 25 times its quantity of a weak hydrochloric acid and 6–8 times shaken with one tenth its volume of the trichlorethylene extract after any precipitates of chlorhydrates are separated. The extract of trichlorethylene is then shaken with a soda solution freed of the sodium solution and evaporated until dry. The residue crystallizes after short standing.

Having now described and ascertained the nature of my invention and the manner in which the same is to be performed I now declare what I claim and desire to secure by Letters Patent of the United States:

1. A process for obtaining the effective principle of the lobelia, consisting in dissolving the mixture of the raw lobelia bases, obtained by the usual methods of recovering alkaloids in hydrochloric acid, separating from the solution thus obtained the difficultly soluble chlorhydrate of the ɞ-lobeline by crystallization and removing the easily soluble chlorhydrate of the effective α-lobeline from the filtrate by shaking same with solvents.

2. A process for obtaining the effective ingredient of the lobelia, consisting in dissolving the mixture of the raw lobelia bases, obtained by the usual methods of recovering alkaloids, in hydrochloric acid, separating the difficulty soluble chlorhydrate of the ɞ-lobeline from the solution by crystallization, and extracting the easily soluble chlorhydrate of the effective α-lobeline from the filtrate by shaking same with chloroform.

3. As a new article of manufacture an alkaloid having the medicinal properties of *Lobelia inflata*, said alkaloid having the formula $C_{21}H_{25}NO_2$, forming colorless crystals melting at 120° C., furnishing an amorphous yellowish-white platinum chloride double salt containing 17.6% Pt., furnishing a difficultly soluble mercurous double salt, its free base being very difficultly soluble in water, its chlorhydrate being easily soluble in water, chloroform, substantially as hereinbefore described.

In testimony whereof, I have signed my name to this specification in the presence of two subscribing witnesses.

Dr. HEINRICH WIELAND.

Witnesses:
 Paul Drey,
 Anna Niedermaier.